SEMICONDUCTOR SIGNAL TRANSLATING DEVICES
Filed Oct. 31, 1952 2 Sheets-Sheet 1
FIG. 1
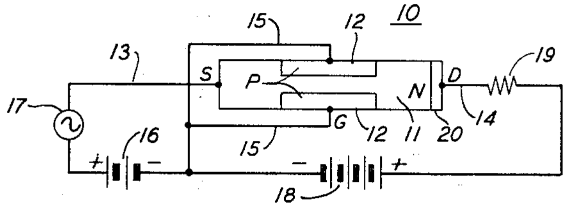
FIG. 2
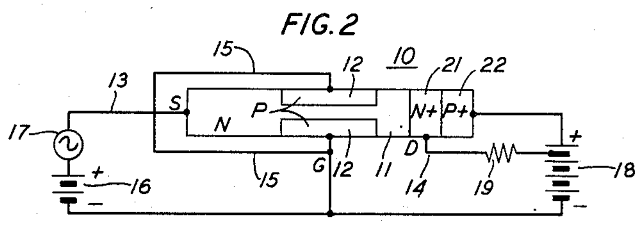
FIG. 3
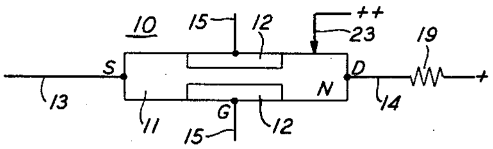
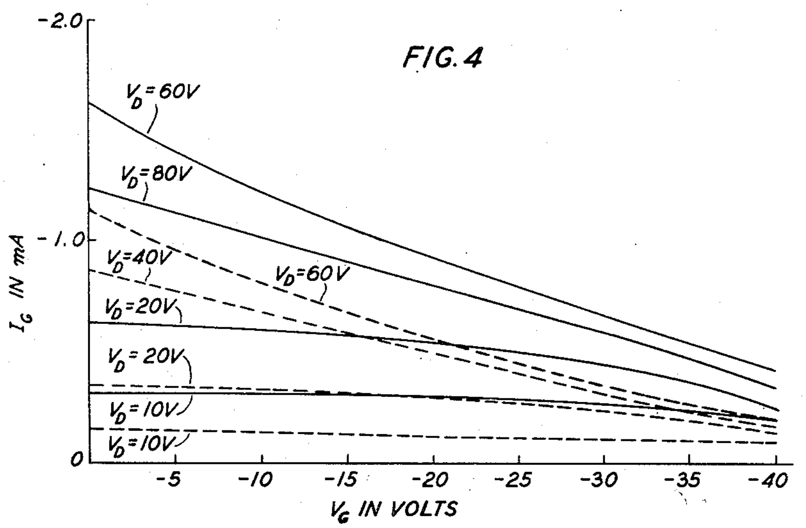
INVENTORS: G. C. DACEY
I. M. ROSS
BY
ATTORNEY

SEMICONDUCTOR SIGNAL TRANSLATING DEVICES

Filed Oct. 31, 1952 2 Sheets-Sheet 2

INVENTORS G. C. DACEY
I. M. ROSS
BY [signature]
ATTORNEY

United States Patent Office 2,778,956
Patented Jan. 22, 1957

2,778,956

SEMICONDUCTOR SIGNAL TRANSLATING DEVICES

George C. Dacey, Chatham, and Ian M. Ross, Summit, N. J., assignors to Bell Telephone Laboratories, Incorporated, New York, N. Y., a corporation of New York Application October 31, 1952, Serial No. 318,053

18 Claims. (Cl. 307—88.5)

This invention relates to semiconductor signal translating devices and more particularly to such devices of the type disclosed in the application Serial No. 243,541 filed August 24, 1951, of W. Shockley which issued on May 8, 1956, as U. S. Patent 2,744,970.

Devices of the type disclosed in the above-identified application comprise, generally, a body of semiconductive material having therein a region or zone of one conductivity type flanked by and contiguous with a pair of zones of the opposite conductivity type. Individual connections, herein termed the source and drain, are made to opposite ends of the first zone, and a third connection, termed the gate herein, is made to the other two zones in common. Both the source and drain are biased relative to the gate so that the PN junctions between contiguous zones are biased in the reverse direction, the potential of the drain, however, being substantially greater than that of the source. Signals are impressed between the source and gate and amplified replicas thereof are obtained in a load or utilization circuit connected between the gate and drain. In effect, the variations in the potential of the gate control the conductivity of the path for the flow of electrical carriers in the intermediate zone from the source to the drain.

One general object of this invention is to enhance the performance of semiconductor signal translating devices of the general type above described. A specific object of this invention is to enable control of the current gain for such devices and, more particularly, to attain current gains greater than unity.

Conductivity in semiconductors such as germanium and silicon is associated with two types of electrical carriers to wit, holes and electrons. In extrinsic material, as is now known, both types of carriers are present but one is in excess of the other. Those in excess are known as majority carriers and those in the minority as minority carriers. In N conductivity type material, the majority carriers are electrons and the minority carriers are holes; in P type material, the majority carriers are holes and the minority carriers are electrons.

In devices of the type above described, it has been found that the flow of majority carriers from the source to the drain has associated therewith a flow of minority carriers from the drain. It has been found further that the latter is amenable to control and that advantageous results, notably alphas greater than unity and negative resistance characteristics, can be realized by establishing a controlled flow of minority carriers from the drain to the gate. The mechanism involved in minority carrier flow, it has been determined, is dependent upon the drain connection.

In accordance with one broad feature of this invention, in a device of the character under consideration, the drain connection and region are made such as to enhance the flow of minority carriers to the gate. The minority carrier current is controlled by the majority carrier current from the source in such manner that the change in gate voltage to effect an increase in the minority carrier current is of the sign such that the associated dynamic resistance is negative.

In one illustrative embodiment of this invention, the intermediate zone of the semiconductive body is of N conductivity type and the gate zones are of P type and biased negative relative to both the source and drain. Thus, the majority carriers in the intermediate zone, that is those flowing from source to drain, are electrons, and the minority carriers in this zone are holes. The bias of the gate is such, it will be noted, as to attract the minority carriers thereto from the intermediate zone.

In one specific embodiment, and this illustrates a particular feature of this invention, the drain connection is constructed so as to maintain the minority carrier density in the vicinity thereof at the equilibrium value. This may be effected by establishing a surface or region at or adjacent the drain electrode characterized by low carrier lifetime characteristics, for example by including or introducing into this region an element such as nickel which results in low carrier lifetimes, or producing thereat crystal imperfections as by sandblasting or electron bombardment.

In another specific embodiment, and this illustrates another particular feature of this invention, means are provided to effect injection into the drain region of minority carriers substantially proportional to the majority carriers arriving at the drain. Such injection may be obtained by providing a PN junction at the drain region and controlling the junction bias in such manner that a minority carrier current is injected into the intermediate region, of magnitude dependent upon the drain or load current. For example, the junction may be biased in the forward direction and its potential controlled in accordance with the drop across a resistor in series with the drain.

The invention and the above noted and other features thereof will be understood more clearly and fully from the following detailed description with reference to the accompanying drawing in which:

Fig. 1 is a diagram depicting the principal components of a signal translating device illustrative of one embodiment of this invention;

Fig. 2 is a diagram representing another embodiment involving minority carrier injection adjacent the drain;

Figure 5:
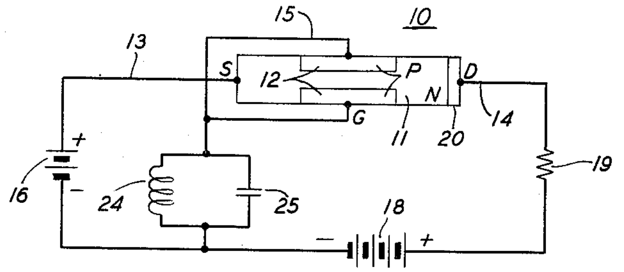
Figure 6:
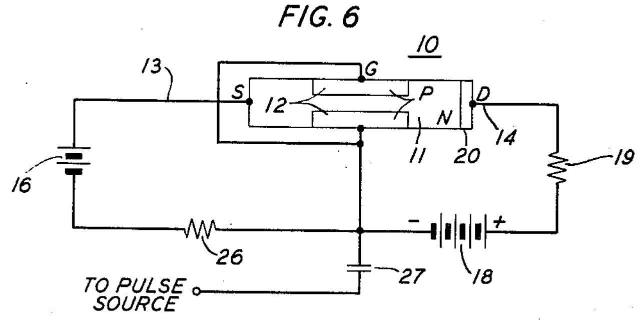
Figure 7:
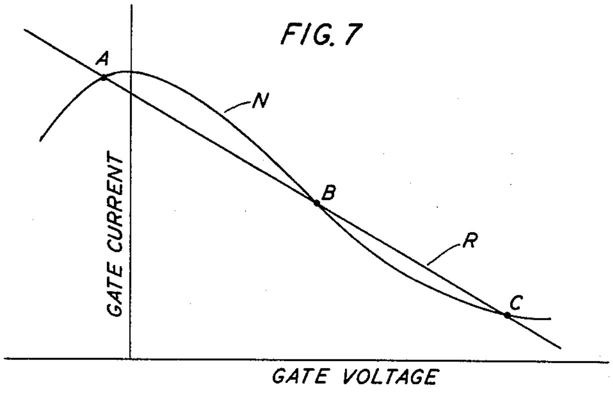

Fig. 3 portrays another embodiment including a point contact for effecting injection of minority carriers into the drain gate region;

Fig. 4 is a graph representing operating characteristics of a typical device constructed in accordance with this invention;

Fig. 5 is a schematic portraying an oscillation generator illustrative of one embodiment of this invention;

Fig. 6 illustrates a bistable translating device embodying this invention and particularly useful in switching applications; and Fig. 7 is a graph illustrating operating characteristics of the device of Fig. 6.

In the drawing, in the interest of clarity of illustration, the semiconductive body has been shown to a greatly enlarged scale. The order of magnitude of the enlargement will be evident from the dimensions of a typical device presented hereinafter. Also in the drawing to facilitate understanding thereof, the source, drain and gate connections are identified by the letters S, D and G respectively and the conductivity type of each of the several regions or zones of the semiconductive body has been indicated by the appropriate letter N or P.

Referring now to Fig. 1, the signal translating device therein portrayed comprises a bar or wafer 10 of semiconductive material, the bulk 11 of which is of one conductivity type and the bar or wafer having in two opposite faces thereof zones 12 of the opposite conductivity type.

For example, as indicated in Fig. 1, the bulk of the semiconductive body may be of N conductivity type and the zones 12 may be of P type. A substantially ohmic connection 13 constituting the source connection is made to one end of the body 10 and a second connection 14 constituting the drain is made to the opposite end of the body. Individual substantially ohmic connections 15 are made also to the zones 12, the two being tied together to constitute the gate lead. Alternatively, the P material may encompass the body to provide a single gate zone.

In operation of the device, the source and drain are biased relative to the gate such that the two PN junctions are operated in the reverse direction, the bias upon the drain being substantially greater than that upon the source. The source bias may be provided for example by a battery 16 in series with an input element represented by the generator 17. Similarly the drain bias may be provided by a battery 18 in series with a load represented generally by a resistor 19.

In general, in the operation of the device, majority carriers in the bulk material, specifically electrons in the particular embodiment portrayed, flow from the source 13 to the drain 14. Because of the reverse biases due to the batteries 16 and 18, space charge regions of substantial extent obtain at the PN junctions between the gate zones 12 and the bulk 11. The extent of the space charge region is dependent, of course, upon the biases as is now known in the art, and is variable in accordance with signals impressed between the source and gate by the generator 17. The space charge regions determine the impedance to flow of the majority carriers from the source to the drain so that the current supplied to the load 19 is controllable in accordance with signals impressed by the generator 17. As indicated in the application of W. Shockley referred to hereinabove, power and voltage gains are realizable.

In accordance with one feature of this invention, there is provided adjacent the drain connection 14 a surface or region leading to enhanced flow of minority carriers, holes in the case of the specific embodiment portrayed in Fig. 1, from the drain to the gate. The minority carrier current is proportional generally to the majority carrier current from the source to the drain. A change in the gate voltage of the character to produce an increase in majority carrier current results in an increase in the minority carrier current flowing from drain to gate. Specifically, if the change in the gate voltage is such as to reduce the extent of the space charge regions at the PN junctions aforenoted the source to drain current increases and the drain to gate current constituted by minority carriers also increases. The sign of the change in the gate voltage requisite to effect such increase in gate current is patently such that the associated dynamic resistance is negative.

Specifically, for a device as depicted in Fig. 1 wherein the bulk of the semiconductor is N type, if the gate zones are made more positive the reverse biases on the two PN junctions decrease whereby the space charge regions at these junctions decrease in extent. The majority carrier flow from source to drain increases and the minority current from drain to gate also increases. Thus, a negative resistance characteristic obtains.

The magnitude of the minority carrier flow from drain to gate is dependent upon the nature of the surface or region 20 adjacent the drain connection 14. In accordance with one feature of this invention, this surface or region is made such that such minority carrier flow is enhanced. Specifically, in one embodiment, this surface or region is constructed or treated so that it exhibits a low carrier lifetime property. Such surface or region, it has been found, is capable in effect, of generating minority carriers in number sufficient to maintain the minority carrier density therein at substantially the equilibrium value. Hence, as minority carriers in this region are reduced due to, for example, recombination with majority carriers, additional minority carriers are generated to maintain an equilibrium value. In effect, therefore, the surface or region 20 provides a copious supply of minority carriers.

The property of low lifetime for the region 20 can be obtained in several ways. For example, the drain connection 14 may be affixed to the body 11 by use of a solder composed essentially of 10 percent antimony and 90 percent tin. The antimony-tin alloy, it has been found, effects a marked reduction in the carrier lifetime property of the adjacent semiconductive material. In another example, nickel is introduced, as by diffusion, into the portion 20 of the body whereby the desired low lifetime property is realized. Also this property may be achieved by creating crystal imperfections in the region 20, for example by sandblasting the surface of the semiconductor adjacent the drain connection 14. In another example, the drain connection is made by way of a rhodium plating.

The maximum frequency at which the negative resistance obtains is dependent upon the rate at which minority carriers can be drawn into the gate, and this rate in turn is dependent upon the field extant in the gate-drain region and the lifetime of the minority carriers. Hence, in order that high frequency response may be obtained, the gate to drain spacing should be small, the carrier lifetime for the semiconductive material in the major part of the gate to drain region should be high and the lifetime for the region 20 should be small. In a typical device operable up to frequencies of about 100 megacycles, the body 10 may be .001 inch thick by .01 inch wide by .1 inch long with the bulk 11 of N conductivity type and having a resistivity of 30 ohm centimeter and a lifetime for holes of 1000 $\mu$sec. The region 20 may be produced by Sb-Sn alloying and exhibit a lifetime for holes of about $10^{-3}$ sec. The gate to drain spacing may be approximately .001 inch.

It may be noted that drain contacts of the character thus far described involve replacement of minority carriers through the agency of the low lifetime region, to maintain equilibrium minority concentration. The mechanism entails generation of such carriers in the region 20 and, thus, is sensitive to both temperature and light variations. Hence, the negative resistance characteristic is subject to monitoring or control by variation or adjustment of the temperature of or illumination of the region 20. In general, the negative resistance will increase with temperature and with intensity of illumination. Thus, devices including drain regions of the replacement type can be employed to monitor, measure and control either or both temperature or illumination.

The requisite flow of minority carriers from drain to gate in quantity proportional to the majority carrier current to the drain, thereby to produce the negative resistance characteristic, can be realized also by the injection of minority carriers into the gate-drain region. One manner in which this may be effected is illustrated in Fig. 2. As shown in this figure, the semiconductive body 10 is similar to that in the embodiment of this invention depicted in Fig. 1 and described heretofore but includes in addition, a strongly N type region 21 and a strongly P type region 22.

The drain connection 14 is made to the region 21 and is biased positively with respect to the gate and source as by the battery 18 through the load resistor 19. The strongly P type region 22 also is biased positively by the battery 18 and at a potential somewhat higher than that of the zone or region 21. Thus, the junction between the zones or regions 21 and 22 is biased in the forward direction whereby minority carriers, to wit holes, from the region 22 flow across this junction, diffuse through the region 21 and thence into the bulk 11 of the body 10. These minority carriers are attracted to the gate zones 12 and constitute the minority carrier current from the drain to the gate.

The bias upon the junction and consequently the injection of minority carriers into the bulk 11 will be dependent upon the majority carrier current to the drain. For example, if the potential of the gate 15 is changed in such manner that the electron current from the source to the drain increases, the drop across the load resistor 19 will increase. As a consequence, the forward bias across the junction between the zones or regions 21 and 22 will increase and a greater hole current will be injected into the gate-drain region. The relationship between variations in majority carrier flow to the drain and minority carrier flow from the drain to the gate may be made of any desired value by appropriate adjustment of the normal biases upon the zones 21 and 22.

Because of the inherent resistance of the semiconductive material between the gate and the drain, a degenerative effect obtains which tends to linearize the dependence of the minority carrier current upon the majority carrier current.

Injection may be effected also as illustrated in Fig. 3 through the agency of a point contact 23 bearing against the body 10 in the vicinity of the drain-gate region. The operation of this embodiment is similar to that of the one illustrated in Fig. 2. Specifically, the contact 23 is biased in the forward direction through the load resistor 19 so that its potential is dependent upon the load current. Hence, the minority carriers injected into the gate-drain region from the contact 23 are dependent in number upon the majority carrier current to the drain 14 and the desired negative resistance characteristic is obtained.

A particular advantage of the embodiments illustrated in Figs. 2 and 3 is that the minority carrier density in the drain region may be made of any desired value, for example substantially greater than the equilibrium density. This enables use of low resistivity material adjacent the drain. Thus, both a high transconductance and a high ratio of minority to majority carrier currents can be realized. As the negative resistance in devices of the type to which this invention pertains is inversely proportional to the product of the transconductance and the fraction of the total current due to the minority carriers, it is evident that the embodiments portrayed in Figs. 2 and 3 enable attainment of low negative resistances.

Also, as has been indicated hereinabove, in these embodiments the minority carrier density, and hence the negative resistance, is controllable, as by variation of the normal forward bias of the junction between the zones or regions 21 and 22.

Further, in the embodiments illustrated in Figs. 2 and 3, the minority carrier density can be made much greater than the equilibrium value so that the device will be less sensitive to temperature and light effects than those of the construction depicted in Fig. 1 and described hereinabove.

The gate characteristic of a typical device of the construction illustrated in Fig. 1 is portrayed in Fig. 4 wherein the ordinates are gate current, the abscissae are gate voltage and the third variable is the drain voltage, the value of the latter being indicated on each curve. In this figure, the solid curves are for an operating temperature of 25° C. and the dotted curves are for a temperature of 0° C. Both the negative resistance and the dependence thereof upon temperature are evident.

Devices of the constructions illustrated in Figs. 1, 2 and 3 are particularly suitable for use as oscillation generators, one form of which is illustrated in Fig. 5. As there shown, a parallel, resonant, frequency determining circuit comprising an inductor 24 and capacitor 25 is connected in the gate lead.

A signal generator or source, not shown in Fig. 5, may be included in the circuit of this figure as in the manner illustrated in Fig. 1, thereby to provide a local oscillator-mixer combination.

Fig. 6 portrays a bistable switch illustrative of another embodiment of this invention. The semiconductive element and the circuitry are similar to that in the device depicted in Fig. 1 and described hereinabove. The switch includes also a resistor 26 in the source-gate circuit and a condenser 27 by way of which pulses may be applied to the gate. The resistor 26 should be large in comparison to the negative resistance of the gate.

As has been noted hereinabove, the negative resistance of the gate is inversely proportional to the transconductance. The latter, designated $g_m$, may be defined mathematically as $$g_m=\frac{\partial I_D}{\partial V_G}\bigg|V_D=\text{a constant}$$

where $I_D$ is the drain current and $V_G$ the gate voltage.

The transconductance decreases as a result of an increase in the gate bias. Thus, the magnitude of the negative resistance increases. If the gate bias is decreased, whereby the drain current increases, a point will be reached where the gate is biased in the forward direction and the gate resistance is positive.

The relationships involved are represented in Fig. 7 wherein ordinates are gate current, abscissae are gate voltage, N is the gate characteristic and the line R is the load line for resistor 26. It is evident that there are three possible operating conditions, to wit at points A, B and C, of which two, at A and C, are stable and the third of which, at B, is unstable. At the right hand region of the characteristic, that is in the vicinity of point C, the gate current is small and the negative resistance is large. At the left hand region of the characteristic, that is in the vicinity of point A, the gate current is large and the gate resistance is positive. Also for condition A, the drain current is large; for condition C the drain current is small.

The device may be triggered from A to C or vice versa by application of pulses to the gate by way of the condenser 27. Specifically, it may be triggered from condition A to condition C by applying a negative pulse to the gate, and from condition C to condition A by applying a positive pulse to the gate.

Although in the specific embodiments of the invention described, the body is of N conductivity type and the gate zones of P type, it will be understood of course that the reverse relation may be utilized, i. e. a P type body and N type zones. For such case, the polarities of the biases should be the reverse of those indicated in the drawing. Also, it will be understood that the embodiments described are but illustrative and that various modifications may be made therein without departing from the scope and spirit of this invention.

What is claimed is:

1. A signal translating device comprising a body of semiconductive material having a region of one conductivity type, source and drain connections to spaced points on said region, means biasing said drain relative to said source at the polarity to attract majority carriers from said source to said drain, means contiguous with said region between said points defining a rectifying junction therewith, means biasing said junction in the reverse direction, means for varying the potential across said junction, a load circuit connected to said drain, and means adjacent said drain for enhancing minority carrier flow therefrom toward said junction.

2. A signal translating device in accordance with claim 1 wherein said last mentioned means comprises a portion in said body adjacent said drain having a carrier lifetime less than that of said region.

3. A signal translating device in accordance with claim 1 wherein said last mentioned means comprises an auxiliary connection to said region and means energizing said auxiliary connection to inject minority carriers into said region.

4. A signal translating device comprising a body of semiconductive material having a region of one conductivity type therein, source and drain connections to spaced points on said region, said body having therein a zone of the opposite conductivity type contiguous with said region between said points and defining a rectifying junction with said region, a gate connection to said zone, means biasing said drain relative to said source of the polarity to attract majority carriers from said source to said drain and biasing said junction in the reverse direction, means adjacent said drain for enhancing flow of minority carriers from said drain to said gate, means for varying the potential of said gate relative to said source, and a load circuit connected to said drain.

5. A signal translating device comprising a body of semiconductive material having therein a region of one conductivity type between and contiguous with a pair of zones of the opposite conductivity type, source and drain connections to opposite portions of said region, a gate connection to said zones, an input circuit between said source and gate connections including means for biasing said source connection in the reverse direction relative to said gate, a load circuit connected between said drain and gate connections and including means biasing said drain in the reverse direction relative to said gate and at a higher potential than said source, and means adjacent said drain connection for enhancing flow of minority carriers from said drain connection to said gate connection.

6. A signal translating device in accordance with claim 2 wherein said material is germanium and said portion includes nickel.

7. A signal translating device in accordance with claim 2 wherein said portion contains crystal imperfections.

8. A signal translating device in accordance with claim 2 wherein said material is germanium and said portion includes antimony and tin.

9. A signal translating device comprising a body of semiconductive material having therein a first zone of one conductivity type between and contiguous with a pair of zones of the opposite conductivity type, a gate connection to said pair of zones, source and drain connections to opposite ends of said first zone, means biasing said source and drain in the reverse direction relative to said gate and said drain at a higher potential than said source, an input circuit connected between said source and gate, an output circuit connected between said drain and gate, means for injecting minority carriers into the region of said first zone between said gate and drain, and means for controlling the injection of said minority carriers.

10. A signal translating device comprising a body of semiconductive material having therein a first zone of one conductivity type between and contiguous with a pair of zones of the opposite conductivity type, a gate connection to said pair of zones, source and drain connections to opposite ends of said first zone, means biasing said source and drain in the reverse direction relative to said gate and said drain at a higher potential than said source, means for impressing signals between said source and gate thereby to vary the majority carrier flow from said source to said drain, a load circuit connected between said gate and said drain, and means energized in accordance with the current in said load circuit for injecting into said first zone in proximity to said drain, a minority carrier current substantially proportional to said majority carrier flow.

11. A signal translating device comprising a body of semiconductive material having therein a first zone of one conductivity type between and contiguous with a pair of zones of the opposite conductivity type, a gate connection to said pair of zones, source and drain connections to opposite ends of said first zone, means biasing said source in the reverse direction relative to said gate, a load circuit connected between said gate and drain including a resistance, means biasing said drain in the reverse direction relative to said gate, a rectifying connection to said first zone in the vicinity of said drain, and means biasing said rectifying connection in the forward direction through said resistance.

12. An oscillation generator comprising a body of semiconductive material having therein a first zone of one conductivity type between and defining junctions with a pair of zones of the opposite conductivity type, source and drain connections to opposite ends of said first zone, means adjacent said drain connection for enhancing minority carrier flow therefrom, a gate connection to said pair of zones, a first circuit connected between said source and gate including means biasing said source in the reverse direction relative to said gate, a second circuit connected between said gate and drain including means biasing said drain in the reverse direction relative to said gate and at a higher potential than said source, and a resonant circuit common to said first and second circuits.

13. A signal translating device comprising a body of semiconductive material having therein a zone of one conductivity type between and contiguous with a pair of zones of the opposite conductivity type, source and drain connections to opposite ends of said first zone, a gate connection to said pair of zones, a circuit connected between said source and gate including a resistor and means biasing said source in the reverse direction relative to said gate, a second circuit connected between said drain and gate and including means biasing said drain in the reverse direction relative to said gate and at a potential greater than that of said source, and means for applying signal pulses to said gate.

14. A signal translating device comprising a body of semiconductive material having therein a zone of one conductivity type and a pair of zones of the opposite conductivity type on opposite sides of and defining junctions with said first zone, source and drain connections to opposite ends of said first zone, means adjacent said drain for enhancing minority carrier flow therefrom, a gate connection to said pair of zones, means biasing said source and drain in the reverse direction relative to said gate, the bias on said drain being greater than that on said source whereby the gate-current-gate-voltage characteristic has a negative resistance portion, a resistance connected between said source and gate and of magnitude greater than the gate negative resistance, and means for applying pulses of either polarity to said gate.

15. A signal translating device comprising a body of semiconductive material having a region of one conductivity type therein, source and drain connections to spaced points of said region, said body having therein a zone of the opposite conductivity type contiguous with said region between said points and defining a rectifying junction with said region, a gate connection to said zone, means biasing said drain relative to said source of the polarity to attract majority carriers from said source to said drain and biasing said junction in the reverse direction, means for varying the potential of said gate relative to said source, means adjacent said drain for enhancing flow of majority carriers from said drain to said gate comprising a zone of opposite conductivity type contiguous with said region in the neighborhood of the drain and an auxiliary connection to said last-mentioned zone, and a load circuit connected to said drain including feedback means to said auxiliary connection.

16. A signal translating device comprising a body of semiconductive material having therein a first zone of one conductivity type between and contiguous with a pair of zones of the opposite conductivity type, source and drain connections to opposite ends of said first zone, the source introducing into and the drain abstracting from said first zone carriers of the type predominant in said first zone, a separate gate connection to each of said pair of zones, the two separate gate connections being short-circuited to one another, said gates abstracting from said first zone carriers of the type in the minority in said first zone, and an auxiliary rectifying connection to said first zone adjacent the drain connection for injecting into said first zone carriers of the type in the minority in said first zone.

17. A signal translating device in accordance with claim 16 wherein said auxiliary rectifying connection to said first zone comprises a zone of opposite conductivity type contiguous to said first zone and a connection thereto.

18. A signal translating device in accordance with claim 16 wherein said auxiliary rectifying connection comprises a point contact rectifying connection to said first zone.

References Cited in the file of this patent

UNITED STATES PATENTS

| | | |
|---|---|---|
| 2,502,488 | Shockley | Apr. 4, 1950 |
| 2,600,500 | Haynes et al. | June 17, 1952 |
| 2,623,102 | Shockley | Dec. 23, 1952 |
| 2,623,105 | Shockley | Dec. 23, 1952 |
| 2,666,814 | Shockley | Jan. 19, 1954 |